United States Patent [19]
Song et al.

[11] Patent Number: 5,673,350
[45] Date of Patent: Sep. 30, 1997

[54] LASER MODULE WITH FOCUSING LENS AND FIXING METHOD OF THE FOCUSING LENS

[75] Inventors: Min-Kyu Song; Seung-Goo Kang; Hee-Tae Lee; Nam Hwang; Seong-Su Park; Dong-Goo Kim, all of Daejeon, Rep. of Korea

[73] Assignee: Electronics and Telecommunications Research Institute, Daejeon-shi, Rep. of Korea

[21] Appl. No.: 573,553

[22] Filed: Dec. 15, 1995

[30] Foreign Application Priority Data

Nov. 17, 1995 [KR] Rep. of Korea .................. 95-42064

[51] Int. Cl.$^6$ ............................................. G02B 6/36
[52] U.S. Cl. ................... 385/93; 385/33; 385/90; 385/91; 385/92
[58] Field of Search ..................... 385/33, 34, 35, 385/31, 49, 88, 89, 90, 91, 92, 93, 94

[56] References Cited

U.S. PATENT DOCUMENTS

| | | | |
|---|---|---|---|
| 4,761,788 | 8/1988 | Dietrich et al. | 372/36 |
| 4,803,689 | 2/1989 | Shibanuma | 327/36 |
| 5,065,226 | 11/1991 | Kluitmans et al. | 385/92 |
| 5,119,462 | 6/1992 | Matsubara et al. | 385/93 |
| 5,195,155 | 3/1993 | Shimaoka et al. | 385/90 |
| 5,333,224 | 7/1994 | Kikuchi | 385/93 |

*Primary Examiner*—Brian Healy
*Attorney, Agent, or Firm*—Larson and Taylor

[57] ABSTRACT

The present invention relates to an accurate method using laser welding for mounting an optical focusing lens utilized in a semi-conductor laser module for optical transmission and optical amplification through an optical fiber and a laser module so produced. The laser module includes an aligned laser diode, a lens fixture mounting the laser diode, a focusing lens mounted within a lens housing which in turn is mounted by a lens ring to the lens fixture. In the method, the steps include aligning mutual positions between the laser diode and the optical focusing lens in the vertical and horizontal directions so that the magnitude of the optical signal output from the optical fiber is maximized after the distance between the optical focusing lens and the optical fiber is adjusted and fixed to obtain a maximum optical coupling efficiency between the laser diode and the optical fiber. Next a laser-welding step is performed at an interval between the lens housing and the lens ring. The mutual positions between the laser diode and the optical focusing lens are aligned in the vertical and horizontal directions so that the magnitude of the optical signal output from the optical fiber is maximized. Finally a laser-welding step is performed at an interval between the lens fixture and the lens ring.

5 Claims, 6 Drawing Sheets

LASER MODULE WITH FOCUSING LENS AND FIXING METHOD OF THE FOCUSING LENS

BACKGROUND OF THE INVENTION

1. Field of the Invention

The present invention relates to a laser module with focusing lens and a fixing method of the focusing lens, and more particularly to a semiconductor laser module for optical transmission and optical amplification attached with optical fiber and to an accurately fixing method of focusing lens used for the laser module by way of laser welding method.

2. Description of the Prior Art

Important things that are supposed to be well considered in packaging the semiconductor laser module used for high speed optical transmission or optical amplification are electrical, thermal, optical and mechanical sides, so that laser diode characteristics (by way of example, single mode operation) is not deteriorated to thereby be transmitted to optical fiber.

In view of the optical side of the packaging among those listed, it should be noted that an average optical output required by the system be maintained by compensating a low electrical/optical efficiency of a laser diode itself according to acquisition of high optical coupling efficiency of the laser diode and the optical fiber, and, at the same time, optical feedback be interdicted resulting to an adverse effect to a stable single operation mode of the laser diode.

Furthermore, view of reliability-considered mechanical side, it should also be noted that module design and manufacturing process thereof be so developed that arrangement of assembled optical parts are not influenced by outer changes.

FIGS. 1A and 1B illustrate, as a prior art, structure of representative semiconductor laser module for high speed optical communication manufactured as base mainly in consideration of those sides listed above.

As illustrated in FIGS. 1A and 1B, the laser module for high speed optical transmission according to the prior art is such that a laser diode 1 attached on a heat-dispersing substrate 3 is assembled to a thin film resistor 2-inhered chip carrier 7 along with an optical detector 4 and a heat measuring element 6, which is in turn assembled to an L-shaped lens fixture 8 for fixing a lens 5, and fixed by epoxy with the focusing lens 5 being arranged.

The same is attached on a thermoelectric cooling element 9 attached under a butterfly package 15 and serves to transmit a high speed signal by way of a microscrip line 10.

At this time, the same is so arranged as to allow the light which has passed through an optical feedback interceptor to reach the optical fiber 13, and then an optical fiber protector 16 is caused to be fixed into a screwed groove of the butterfly package 15 by way of a structure ring 12 and a ferrule housing 14.

However, there is a problem in the conventional structure and fixing method thereof in that a process of accurately adjusting distance and optical axis is very difficult when the focusing lens 5 and the laser diode 1 are arranged, and on top of that, even though the arrangement is established, the same is deviated no less than scores of μm from the optical axis according to quantity of epoxy and processing condition (hardening time and temperature) when fixed by epoxy, to thereby decrease optical coupling efficiency markedly and provide no flawless solution on the reliablility side.

SUMMARY OF THE INVENTION

The present invention has been disclosed to solve the aforesaid problem and it is an object of the present invention to provide a laser module with focusing lens and a fixing method of the focusing lens by which unit process development of optical transmission laser diode module or optical amplification laser diode module can be easy and displacement between parts can be minimized even in reliability test such as temperature changes after welding, to thereby increase performance of the optical module and productivity thereof.

In accordance with one aspect of the present invention, there is provided a laser module with focusing lens employing a laser diode for outputting an optical signal by receiving an electrical signal, an optical fiber for transmitting the optical signal output from the laser diode to an external circuit, an optical focusing lens for being disposed between the laser diode and optical fiber in order to focus the optical signal output from the laser diode to the optical fiber and a lens fixture having a lens housing hole for fixing the optical focusing lens, the laser module comprising:

a lens housing for housing the optical focusing lens to thereby insert the same into the lens fixture; and a lens ring for connecting the lens diode, optical focusing lens and an optical axis to thereby fix the optical focusing lens housed by the lens housing to the lens fixture so that optical coupling efficiency can be maximized.

In accordance with another aspect of the present invention, there is provided a method of fixing the focusing lens which is applied to the lens fixture with the laser diode disposed thereon, the lens housing for housing the optical focusing lens to thereafter be inserted into the lens fixture, the lens ring inserted into the lens housing and the laser module including the optical fiber, the method comprising the steps of:

arranging mutual positions between the laser diode and the optical focusing lens to vertical and horizontal directions so that magnitude of optical signal output from the optical fiber can be maximized after a distance between the optical focusing lens and the optical fiber is adjusted and fixed to obtain a maximum optical coupling efficiency between the laser diode and the optical fiber;

laser-welding an interval between the lens housing and the lens ring;

arranging mutual positions between the laser diode and the optical focusing lens to vertical and horizontal directions so that magnitude of the optical signal output from the optical fiber can be maximized; and laser-welding an interval between the lens fixture and the lens ring.

BRIEF DESCRIPTION OF THE DRAWINGS

For fuller understanding of the nature and objects of the invention, reference should be made to the following detailed description taken in conjunction with the accompanying drawings in which:

FIG. 1A is a plan view and FIG. 1B is a side view;

FIG. 2A is a plan view and FIG. 2B is a side view;

DETAILED DESCRIPTION OF THE INVENTION

An embodiment of the present invention will be described in detail with reference to the accompanying drawings.

Figure 1A:
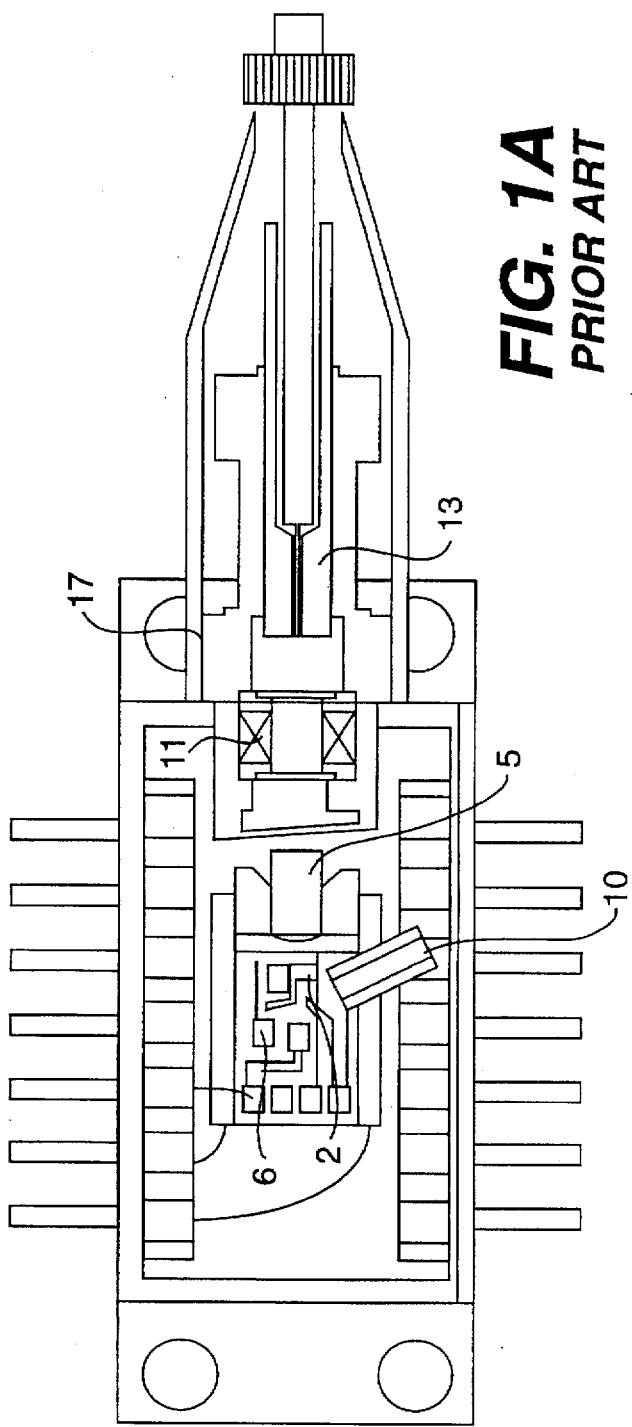
FIGS. 1A and 1B are block diagrams of a conventional high speed optical communication module, where
Figure 1B:
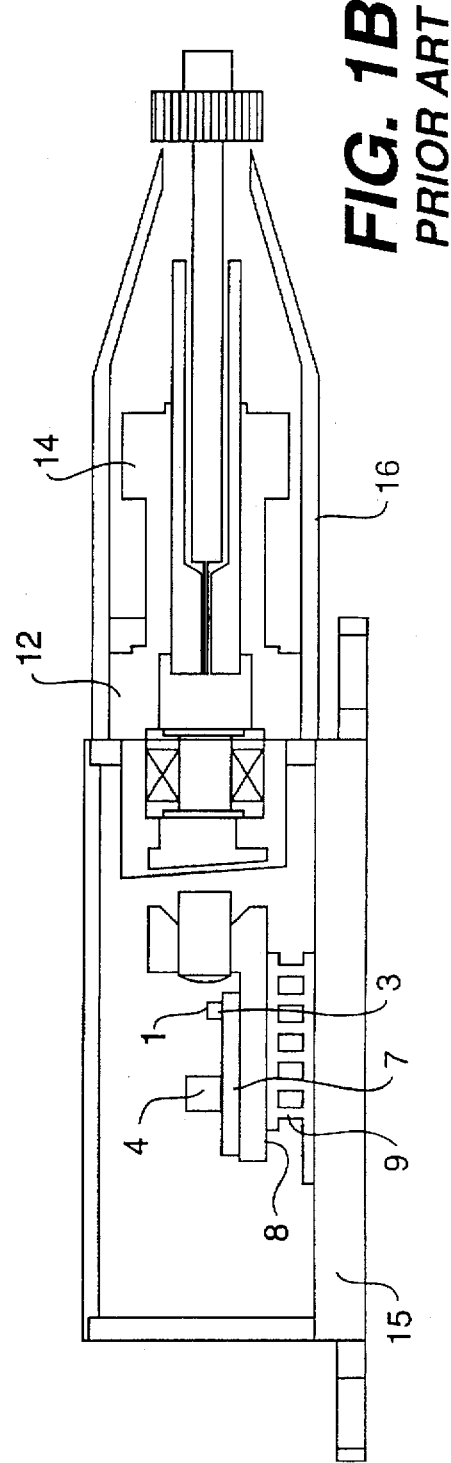
Figure 2A:
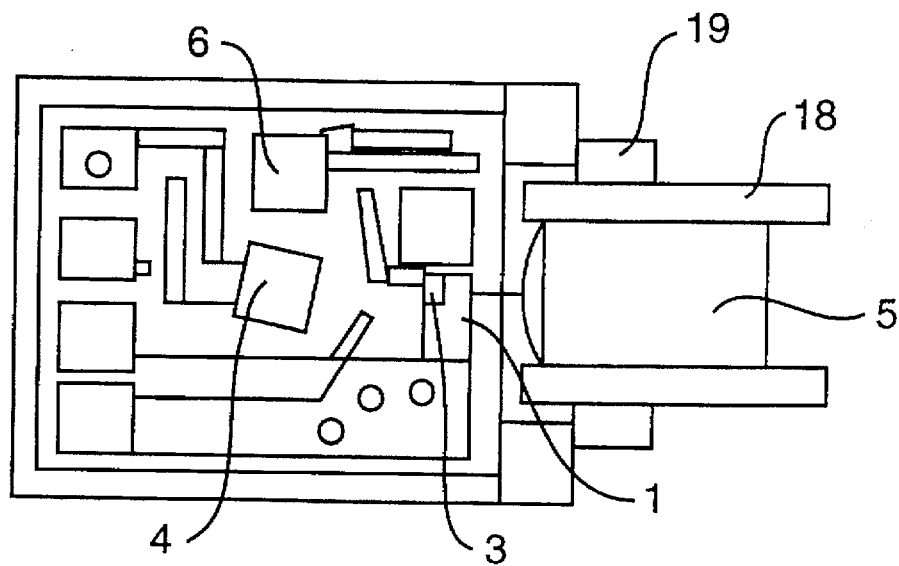
FIGS. 2A and 2B are schematic diagrams for illustrating lens fixing method according to the present invention, where
Figure 2B:
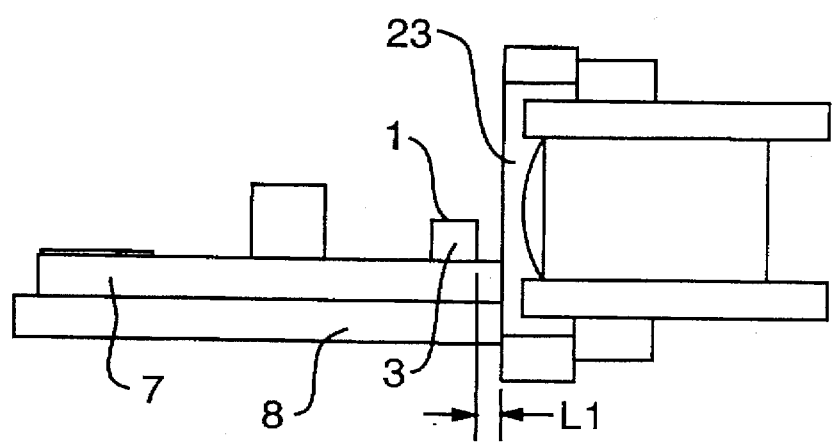

As illustrated in FIGS. 2A and 2B, a laser diode 1 utilized according to the present invention is attached on a diamond heat dispersing substrate 3 and assembled on a chip carrier 7 along with an optical detector 4 and a heat measuring element 6.

At this time, it should be noted that a total thickness (approximately 1.2 mm) of the heat dispersing substrate 3 and the chip carrier substrate 7 is considered to correspond with a hole 23 at a center thereof at the lens fixture.

The chip carrier 7 serves to fix the laser diode on the lens fixture by way of epoxy or solder having a high thermal conductivity, so that the laser diode can be centrally positioned in the hole of the lens fixture.

The hole of the lens fixture should be proceeded approximately 30 μm wider in diameter than that of the lens housing, so that the lens housing can be inserted thereinto and arranged in the horizontal direction.

Generally, a laser welding is better performed on metals having low thermal conductivity, so that the structure (lens housing and ring) for fixing the focusing lens utilizes stainless 304L steel which laser-welds well.

The lens fixture has utilized a weldable copper/tungsten (Cu/W) alloy which has an excellent thermal conductivity because the heat coming from the laser diode should be effectively transmitted to a thermoelectric cooling element.

Generally, a focusing lens having a plano-convex shape with 1.8 mm in diameter and approximately 3.2 mm in length is a glass rod gold-plated therearound.

A cylindrical lens housing is structured in its inner diameter to have a larger diameter by scores of μm than that of lens so that the lens can be fixed therein by epoxy or solder.

The lens housing is preferred in its outer diameter to have a thickness of 200–300 μm in consideration of weld depth during laser welding.

A lens ring serves to have the laser diode, lens and optical axis of the optical fiber corresponded and fixed thereamong, as illustrated in FIGS. 2A and 2B, and to be inserted into the lens housing to thereby be arranged vertically (Z-) and used for coupling with the lens housing 18, and arranged horizontally (X-, Y-) and used for coupling with the lens fixture.

An existing commercialized laser welding apparatus is used for arranging and fixing the focusing lens with the laser diode 1, wherein the apparatus includes a lower collet 20 for grasping the lens fixture 8 having a laser diode assembled thereto, and an upper collet 21 and an inner upper collet 22 for holding the lens housing 18 and an optical fiber ferrule 13.

Now, let's take a look at a collet structure for holding the part, utilizing a laser welding.

An outer shape of parts to be welded is processed cylindrically because most of the optical parts are cylinderical to make it sure that arranged state of the parts to be welded should not be changed by thermal expansion and shrinkage at welded portions occurring in the welding process, so that easy grasp can be possible, generally, by way of a cylindrical collet in order to easily adjust axes of respective parts.

Figure 3:
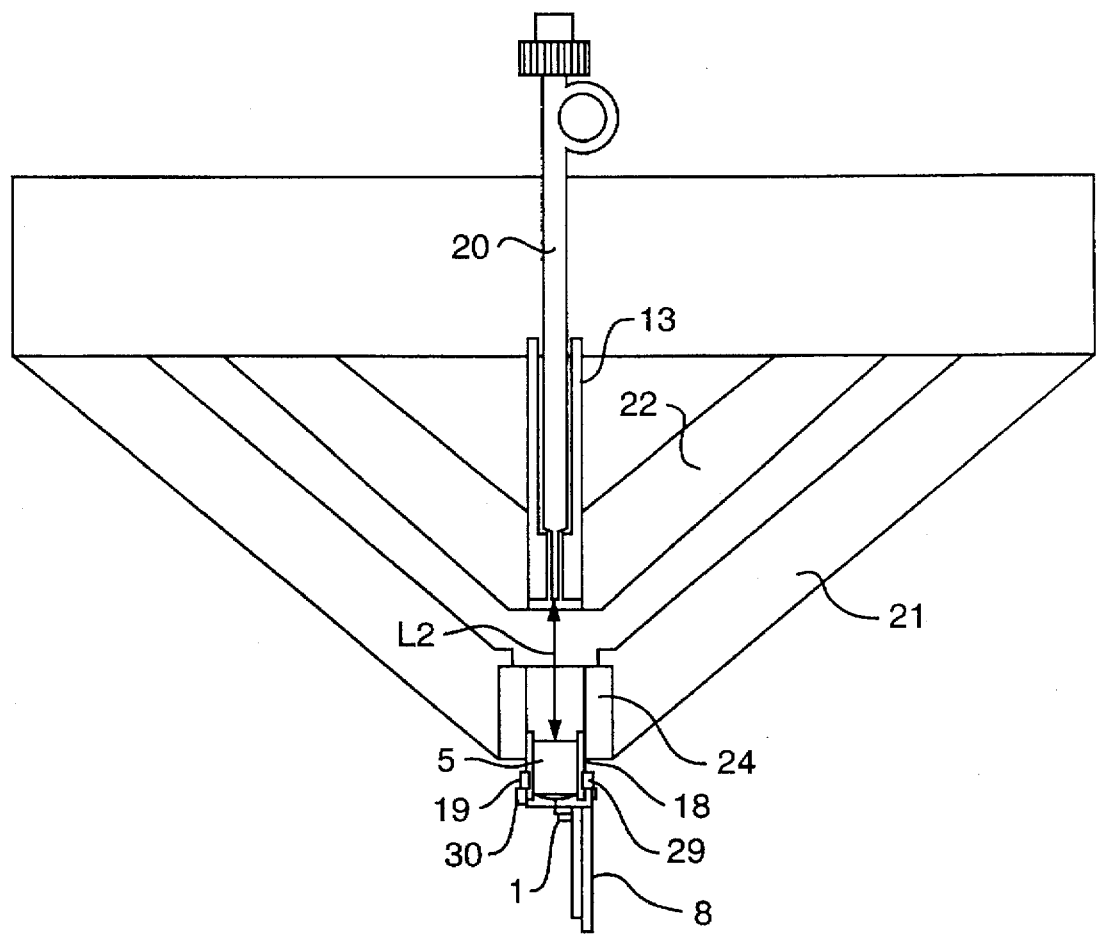
FIG.3 is a schematic diagram for illustrating an arrangement and fixing method utilizing a laser welding apparatus.
Figure 4:
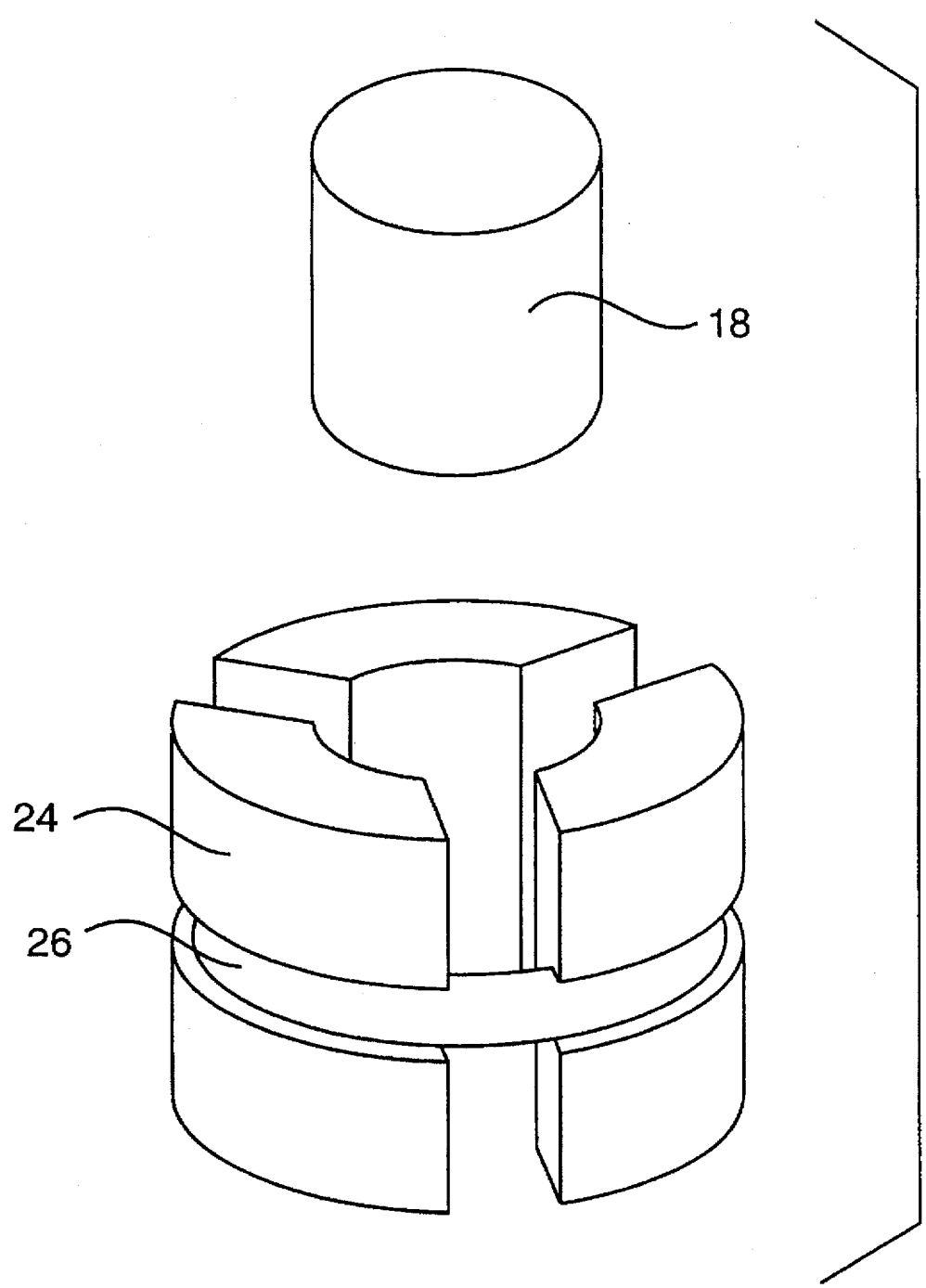
FIG. 4 is block diagram for illustrating an auxiliary block of an upper collet for grasping a lens.

However, there has been few applied cases where an L-shaped lens fixture is used because a firm grasp can hardly be possible As illustrated in FIG. 3, an outer collet 21 and an inner collet 22 at an upper area are formed in concentric circles, where an inner diameter of the inner collet 22 has the same size as that of the optical fiber ferrule, whereas the outer collet 22 needs a cylindrical auxiliary block 24 as illustrated in FIG. 4 in order to hold the lens housing 18 of smaller diameter because the outer collet 21 is measured at an inner diameter thereof at approximately 6 mm so as to hold other welding parts.

Figure 5:
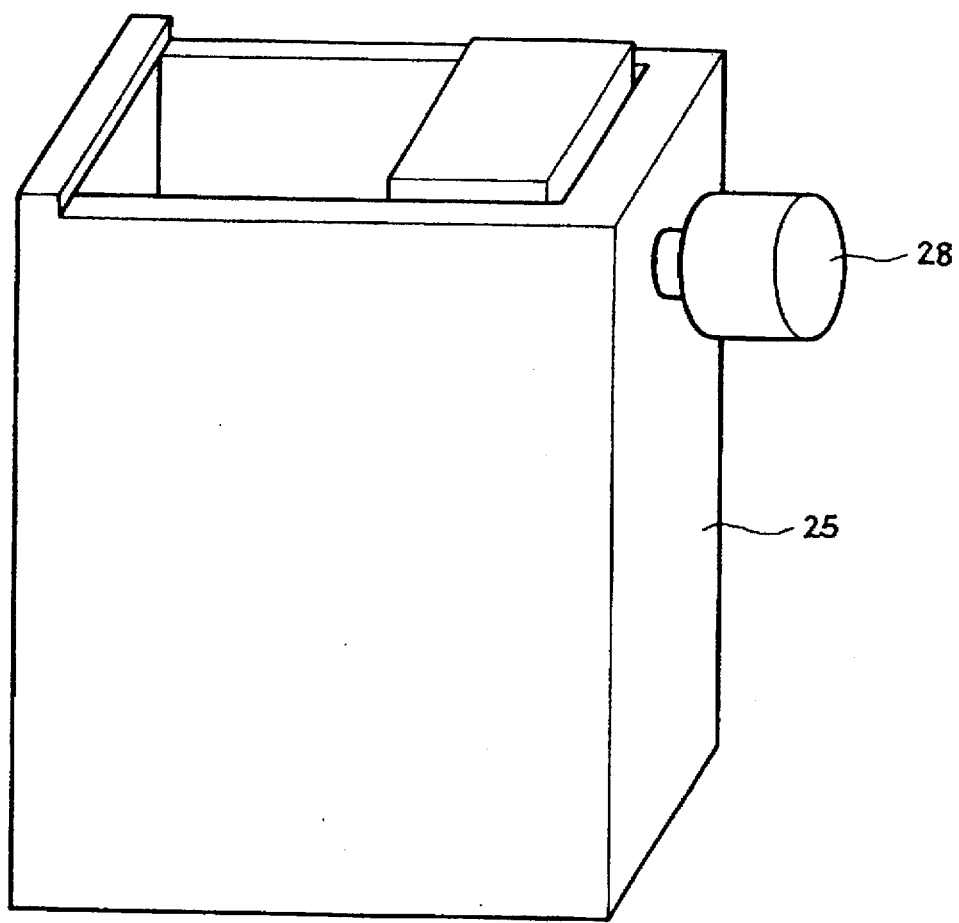
FIG. 5 is a block diagram for illustrating an auxiliary block of a lower collet for grasping a lens fixture.

Furthermore, the lower collet 20 also needs a rectangular auxiliary block 25 designed to allow the lens fixture to be inserted thereinto, as illustrated in FIG. 5, so that the L-shaped rectangular lens fixture can be held.

As illustrated in FIG. 4, the auxiliary block 24 for grasping the lens housing has a tiny cylindrical structure respectively measured 6 mm at an external diameter and 2.6 mm at an inner diameter, and 5 mm at length, and divided into three pieces.

The same is designed to be fixed by O-ring at a central cylindrical portion thereof, so that the lens housing can be inserted into the auxiliary block to thereby be held by the outer collet 21.

As illustrated in FIG. 5, the auxiliary block 25 for holding the lens fixture with a laser diode assembled thereto is so structured that an L-shaped jaw 27 of the lens fixture 8 is overlapped to the auxiliary block and that the lens fixture is grasped at a side thereof by a nut 28.

Figure 6:
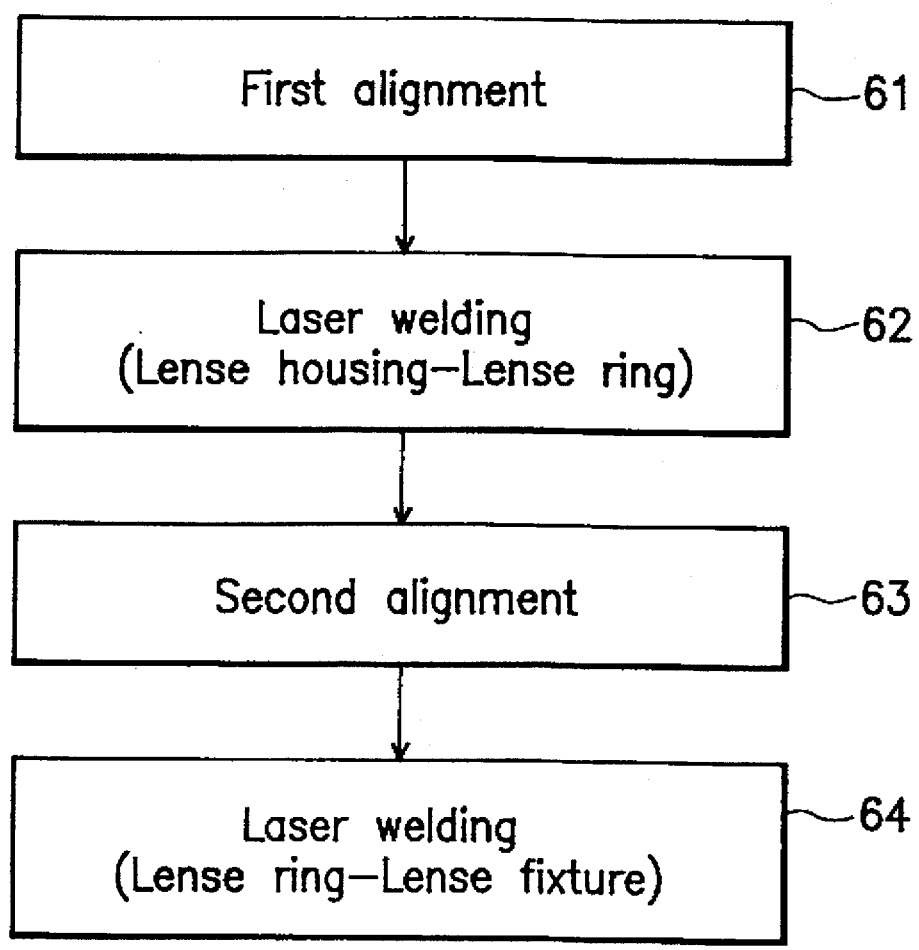
FIG. 6 is a flow chart for illustrating a lens fixing method according to the present invention.

FIG. 6 is a flow chart for illustrating a method of how the optical focusing lens according to the present invention is fixed.

In order to perform the laser welding process, first of all, the lens fixture 8 assembled by the laser diode is fixed by utilizing the auxiliary block 20 of the lower collet, and terminals are interconnected to drive the laser diode.

Furthermore, a single mode optical fiber is caused to be inserted into the upper inner collet 22 and connected to an optical output monitor and the lens housing inserted in the auxiliary block is caused to be held by the upper outer collet 21, and the lens ring is made to be inserted into the lens housing. Then, arrangement in the laser diode, lens and optical fiber is performed.

Distance L2 between the lens disposed at the upper outer collet and the optical fiber correspond with the size of expanded image obtained through the focusing lens and with the size of mode field diameter of the single mode optical fiber, to thereby take an approximate value of 7 mm in case of GRIN lens used as a distance for obtaining a maximum optical coupling efficiency.

The lens and the optical fiber are beforehand fixed at a distance of L2 considered to be optimal and a distance L1 between the laser diode and the lens is adjusted so that the upper collet can be arranged horizontally (X-, Y-) and vertically (Z-) in order to make value of the optical output monitor connected to the optical fiber maximum.

When it is discriminated that the arrangement of the laser diode and optical parts is optimal, the laser welding is performed 62, and at this time, position of three strands of YAG Laser beam is distanced approximately 10 cm from a welded region, to thereby be disposed to be simultaneously scanned at 120 degrees.

When first arrangement is completed, welding 29 between the lens housing and the lens ring is priorly executed to thereby fix L2.

Then, second arrangement is performed 63 horizontally (X-, Y-) and coupling 30 is performed 64 between the lens fixture and the lens ring.

At this time, the lens ring serves to function as a bridge for connecting between the laser diode and lens, and between the lens and the optical fiber axis and for fixing the same.

At this time, the characteristic is that, when the lens ring is inserted into the lens housing and dragged, and when the first arrangement is completed, the lens ring can be fixed by way of laser welding method in natural state without being applied by external force.

The coupled regions are 3 laser beam spots having a diameter of 60 μm, used by simultaneously fixing welding method, and welding condition is that 3 J/fiber of energy has been used with pulse width of 3 msec.

As apparent from the foregoing, effect which can be achieved by the present invention is firstly, the present invention can be applied to high speed laser diode module for optical transmission, and to the laser diode module for optical amplification, secondly, a unit process development can be easily made in case of module completion, to thereby increase productivity, and thirdly, displacement among parts can be minimized even in reliability test such as temperature change after welding, to thereby enhance performance of the optical module.

What is claimed is:

1. A laser module with a focusing lens and a laser diode for generating an output optical signal in response to an electrical signal, an optical fiber for transmitting the optical signal output to an external circuit, an optical focusing lens disposed between the laser diode and the optical fiber to focus the optical signal output on the optical fiber, and a lens fixture having a lens housing hole for fixing the optical focusing lens, the laser module further comprising:

a lens housing, having an outer surface and an inner bore in which the optical focusing lens is housed; and a lens ring mounted on the outer surface of the lens housing for permitting the alignment along an optical axis of the laser diode, the optical focusing lens and the optical fiber before being welded into place and for fixedly mounting the lens housing, and thus mounting the optical focusing lens located therein, to the lens fixture.

2. A laser module as claimed in claim 1 wherein said lens housing is cylindrical with a cylindrical bore therein;

wherein said lens ring is an annular member having an inner hole that has a diameter such that said cylindrical lens housing can be mounted therein; and wherein the lens housing hole has a diameter such that said cylindrical lens housing can be axially positioned therein.

3. A laser module as claimed in claim 2, wherein said lens fixture has a substantially L-shape with a base portion and an upstanding end portion; wherein said lens housing hole is located through said end portion; and wherein said lens ring is rigidly mounted to said end portion and surrounds said lens housing hole.

4. A method for attaching a focusing lens in a laser module that is comprised of a laser diode which generates an output optical signal, an optical fiber for transmitting the optical signal output to an external circuit, an optical focusing lens that is disposed between the laser diode and the optical fiber, a lens fixture having a lens housing holder for fixing the optical focusing lens, a lens housing for housing the optical focusing lens therein and a lens ring which is mounted to the outer surface of the lens housing, the method comprising the steps of:

(a) aligning a mutual position between the laser diode and the optical focusing lens to a vertical and a horizontal direction in order to maximize the optical signal output to the optical fiber, after a distance between the optical focusing lens and the optical fiber is adjusted and fixed to obtain a maximum optical coupling efficiency between the laser diode and the optical fiber;

(b) laser-welding the lens ring to the lens housing at the optimum alignment state, to fix the vertical position of the optical focusing lens;

(c) realigning the mutual position between the laser diode and the optical focusing lens to a horizontal direction in order to maximize the magnitude of the optical signal output to the optical fiber, at the fixed state of the vertical position of the optical focusing lens; and (d) laser-welding the lens ring to the lens fixture to fix the horizontal position of the optical focusing lens.

5. The method for attaching a focusing lens in a laser module as claimed in claim 4, wherein after the step (a) of aligning the mutual position between the laser diode and the optical focusing lens has been completed, step (b) of laser-welding the lens ring to the lens housing is performed such that the lens ring is fixed by laser-welding without any external force being applied.

* * * * *